(12) United States Patent
Yano et al.

(10) Patent No.: US 11,652,682 B2
(45) Date of Patent: May 16, 2023

(54) OPERATIONS MANAGEMENT APPARATUS, OPERATIONS MANAGEMENT SYSTEM, AND OPERATIONS MANAGEMENT METHOD

(71) Applicant: FUJITSU LIMITED, Kawasaki (JP)

(72) Inventors: Ai Yano, Kawasaki (JP); Takeshi Ohtani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 328 days.

(21) Appl. No.: 16/809,005

(22) Filed: Mar. 4, 2020

(65) Prior Publication Data

US 2020/0312468 A1   Oct. 1, 2020

(30) Foreign Application Priority Data

Mar. 28, 2019   (JP) .............................. JP2019-063280

(51) Int. Cl.
*H04L 41/046* (2022.01)
*H04L 67/125* (2022.01)
*G16Y 40/10* (2020.01)
*G16Y 20/10* (2020.01)

(52) U.S. Cl.
CPC ............ *H04L 41/046* (2013.01); *G16Y 20/10* (2020.01); *G16Y 40/10* (2020.01); *H04L 67/125* (2013.01)

(58) Field of Classification Search
CPC ............................. H04L 41/046; H04L 67/125
See application file for complete search history.

(56) References Cited

U.S. PATENT DOCUMENTS

| | | | |
|---|---|---|---|
| 6,718,378 B1 * | 4/2004 | Machida ................. | H04L 43/00 709/224 |
| 9,960,983 B2 * | 5/2018 | Kimura .................... | H04L 43/08 |
| 10,719,380 B2 * | 7/2020 | Miki ....................... | G06N 5/048 |

(Continued)

FOREIGN PATENT DOCUMENTS

| | | |
|---|---|---|
| JP | 2008-15722 A | 1/2008 |
| JP | 2016-162406 A | 9/2016 |
| JP | 2018-097527 A | 6/2018 |

OTHER PUBLICATIONS

Communication from the Japanese Patent Office in Japanese Application No. 2019-063280, dated Jul. 5, 2022.

(Continued)

*Primary Examiner* — Minh Chau Nguyen
(74) *Attorney, Agent, or Firm* — ArentFox Schiff LLP

(57) ABSTRACT

An operations management apparatus includes: a memory; and a processor coupled to the memory, the processor being configured to execute an acquiring processing that includes acquiring operations management information in communications with one or more devices, execute a monitoring processing that includes monitoring conditions of the one or more devices by transmitting or receiving a condition monitoring packet to or from the one or more devices, execute a judging processing that includes judging whether the operations management information has been worsened at the time of transmitting or receiving the condition monitoring packet, and execute a determining processing that includes determining a method of transmitting or receiving the condition monitoring packet depending on a result of judgment made by the judging processing.

10 Claims, 21 Drawing Sheets

(56) References Cited

U.S. PATENT DOCUMENTS

| | | | | |
|---|---|---|---|---|
| 2007/0297391 | A1* | 12/2007 | Furukawa | H04L 29/12424 |
| | | | | 370/352 |
| 2011/0126206 | A1* | 5/2011 | Kato | G06F 9/5094 |
| | | | | 718/103 |
| 2015/0032886 | A1* | 1/2015 | Wang | G06F 11/079 |
| | | | | 709/224 |
| 2016/0006633 | A1* | 1/2016 | Kimura | G06F 11/3055 |
| | | | | 709/224 |
| 2016/0159472 | A1* | 6/2016 | Chan | B64C 27/54 |
| | | | | 244/39 |
| 2018/0046150 | A1* | 2/2018 | Ooba | G05B 13/027 |
| 2018/0164133 | A1 | 6/2018 | Yano et al. | |
| 2018/0302504 | A1* | 10/2018 | Petrioli | H04L 69/18 |
| 2020/0045109 | A1* | 2/2020 | Hegde | H04L 41/20 |

OTHER PUBLICATIONS

Communication from the Japanese Patent Office in Japanese Application No. 2019-063280, dated Nov. 22, 2022.

* cited by examiner

FIG. 3

| DEVICE ID | TIME STAMP | TEMPERATURE | HUMIDITY | ... |
|---|---|---|---|---|
| NODE ID_001 | 1/1/2016 00:00:00.000 | 6.4 | 74 | ... |
| | 1/1/2016 00:00:01.000 | 6.4 | 74 | ... |
| | 1/1/2016 00:00:02.000 | 6.4 | 74 | ... |
| | 1/1/2016 00:00:03.000 | 6.4 | 74 | ... |
| | 1/1/2016 00:00:04.000 | 6.4 | 74 | ... |
| | 1/1/2016 00:00:05.000 | 6.3 | 73 | ... |
| | ... | ... | ... | ... |

| DEVICE ID | TIME STAMP | WATER LEVEL | GAS | ... |
|---|---|---|---|---|
| NODE ID_002 | 1/1/2016 00:00:00.000 | 0.3 | 1.2 | ... |
| | 1/1/2016 00:00:01.000 | 0.3 | 1.2 | ... |
| | 1/1/2016 00:00:02.000 | 0.3 | 1.2 | ... |
| | 1/1/2016 00:00:03.000 | 0.3 | 1.2 | ... |
| | 1/1/2016 00:00:04.000 | 0.3 | 1.2 | ... |
| | 1/1/2016 00:00:05.000 | 0.3 | 1.2 | ... |
| | ... | ... | ... | ... |

FIG. 4

| DEVICE ID | TIME STAMP | RSSI | LQ | RESPONSE TIME | REMAINING BATTERY | ... |
|---|---|---|---|---|---|---|
| NODE ID_001 | 1/1/2016 00:00:00.000 | -53 | 254 | 26.77 | 66 | ... |
| | 1/1/2016 00:00:01.000 | -55 | 251 | 26.39 | | ... |
| | 1/1/2016 00:00:02.000 | -56 | 252 | 23.98 | | ... |
| | 1/1/2016 00:00:03.000 | -54 | 253 | 26.82 | | ... |
| | 1/1/2016 00:00:04.000 | -65 | 246 | 25.29 | | ... |
| | 1/1/2016 00:00:05.000 | -54 | 244 | 25.97 | | ... |
| | ... | | | | ... | |

| DEVICE ID | TIME STAMP | RSSI | LQ | RESPONSE TIME | CPU USAGE | MEMORY USAGE | ... |
|---|---|---|---|---|---|---|---|
| NODE ID_001 | 1/1/2016 00:00:00.000 | -50 | 255 | 66.95 | 47 | 58 | ... |
| | 1/1/2016 00:00:01.000 | -52 | 255 | 66.77 | | | |
| | 1/1/2016 00:00:02.000 | -43 | 255 | 66.25 | | | |
| | 1/1/2016 00:00:03.000 | -51 | 255 | 65.63 | | | |
| | 1/1/2016 00:00:04.000 | -52 | 246 | 68.91 | | | |
| | 1/1/2016 00:00:05.000 | -53 | 248 | 93.90 | | | |
| | ... | | | ... | ... | | ... |

FIG. 5A

| DEVICE ID | TIME STAMP | TEMPERATURE | HUMIDITY | ... |
|---|---|---|---|---|
| NODE ID_001 | 1/1/2016 00:00:00.000 | 6.4 | 74 | ... |
| | 1/1/2016 00:00:01.000 | 6.4 | 74 | ... |
| | 1/1/2016 00:00:02.000 | 6.4 | 74 | ... |
| | 1/1/2016 00:00:03.000 | 6.4 | 74 | ... |
| | 1/1/2016 00:00:04.000 | | | ... |
| | 1/1/2016 00:00:05.000 | 6.3 | 73 | ... |
| ... | | | | |

ACQUISITION FAILED (row 1/1/2016 00:00:04.000)

FIG. 5B

| DEVICE ID | TIME STAMP | RSSI | LQ | RESPONSE TIME | REMAINING BATTERY | ... |
|---|---|---|---|---|---|---|
| NODE ID_001 | 1/1/2016 00:00:00.000 | -53 | 254 | 26.77 | 66 | ... |
| | 1/1/2016 00:00:01.000 | -55 | 251 | 26.39 | | ... |
| | 1/1/2016 00:00:02.000 | -56 | 252 | 23.98 | | ... |
| | 1/1/2016 00:00:03.000 | -54 | 253 | 26.82 | | ... |
| | 1/1/2016 00:00:04.000 | -65 | 246 | 25.29 | | ... |
| | 1/1/2016 00:00:05.000 | -54 | 244 | 25.97 | | ... |
| ... | | | | | | |

EXCEEDING THRESHOLD (< -60)

FIG. 6

| PROTOCOL | DEVICE ID | MONITORING INTERVAL (s) |
|---|---|---|
| SNMP | NODE ID_001 | 10 |
| | NODE ID_002 | |
| | ... | |
| LLDP | NODE ID_011 | 10 |
| | NODE ID_012 | |
| | ... | |
| Ping | NODE ID_021 | 1 |
| | NODE ID_022 | |
| | ... | |
| ... | ... | ... |

FIG. 7

| PROTOCOL | DEVICE ID | Time01 | AGGREGATION |
|---|---|---|---|
| SNMP | NODE ID_001 | × | × |
| | NODE ID_002 | × | |
| | ... | | |
| LLDP | NODE ID_011 | − | − |
| | NODE ID_012 | − | |
| | ... | ... | |
| Ping | NODE ID_021 | − | − |
| | NODE ID_022 | − | |
| | ... | | |
| ... | ... | | |

FIG. 8

| DEVICE ID | SUPPORTED PROTOCOL |
|---|---|
| NODE ID_001 | SNMP |
| | Ping |
| NODE ID_011 | LLDP |
| | Ping |
| NODE ID_021 | Ping |
| ... | ... |

FIG. 11

| PROTOCOL | DEVICE ID | MONITORING INTERVAL (s) | MONITORING TIMING |
|---|---|---|---|
| SNMP | NODE ID_001 | 60 | XX:XX:00 |
| | NODE ID_002 | | XX:XX:01 |
| | ... | | ... |
| LLDP | NODE ID_011 | 12 | XX:XX:08 |
| | NODE ID_012 | | XX:XX:08 |
| | ... | | ... |
| Ping | NODE ID_021 | 1 | XX:XX:00 |
| | NODE ID_022 | | XX:XX:00 |
| | ... | | ... |
| ... | ... | ... | |

FIG. 13

| RELAY ID_101 | | x | |
|---|---|---|---|
| PROTOCOL | DEVICE ID | Time01 | AGGREGATION |
| SNMP (PACKET LENGTH 1) | NODE ID_001 | – | – |
| | NODE ID_002 | – | |
| | ... | | |
| LLDP (PACKET LENGTH 2) | NODE ID_011 | – | – |
| | NODE ID_012 | – | |
| | ... | | |
| Ping (PACKET LENGTH 3) | NODE ID_021 | – | – |
| | NODE ID_022 | – | |
| | ... | | |
| ... | ... | | |

FIG. 15

| RELAY ID_101 | | | |
|---|---|---|---|
| PROTOCOL | DEVICE ID | MONITORING INTERVAL (s) | MONITORING TIMING |
| SNMP (PACKET LENGTH 1) | NODE ID_001 | 60 | XX:XX:00 |
| | NODE ID_002 | | XX:XX:01 |
| | ... | | ... |
| LLDP (PACKET LENGTH 2) | NODE ID_011 | 12 | XX:XX:08 |
| | NODE ID_012 | | XX:XX:08 |
| | ... | | ... |
| Ping (PACKET LENGTH 3) | NODE ID_021 | 1 | XX:XX:00 |
| | NODE ID_022 | | XX:XX:00 |
| | ... | | ... |
| ... | ... | ... | |

FIG. 17

| RELAY ID_101 | | x | |
|---|---|---|---|
| PROTOCOL | DEVICE ID | Time01 | AGGREGATION |
| SNMP (PACKET LENGTH 1) | NODE ID_001 | x | x |
| | NODE ID_002 | x | |
| LLDP (PACKET LENGTH 2) | NODE ID_011 | x | x |
| | NODE ID_012 | x | |
| | ... | | |
| Ping (PACKET LENGTH 3) | NODE ID_021 | – | – |
| | NODE ID_022 | – | |
| | ... | | |
| ... | ... | | |

FIG. 19

| | | | RELAY ID_101 | | | |
|---|---|---|---|---|---|---|
| PROTOCOL | DEVICE ID | MONITORING INTERVAL (s) | MONITORING TIMING | CHANGE PROTOCOL | STOP TRANSMISSION OR RECEPTION OF MONITORING PACKET | EFFECT |
| SNMP (PACKET LENGTH 1) | NODE ID_001 | 60 | XX:XX:00 | ↑ | | PRESENT |
| | NODE ID_002 | | XX:XX:01 | ↑ | | PRESENT |
| | ⋮ | | ⋮ | ⋮ | ⋮ | ⋮ |
| LLDP (PACKET LENGTH 2) | NODE ID_011 | 12 | XX:XX:08 | ↑ | | PRESENT |
| | NODE ID_012 | | XX:XX:08 | ↑ | | PRESENT |
| | ⋮ | | ⋮ | ⋮ | ⋮ | ⋮ |
| Ping (PACKET LENGTH 3) | NODE ID_021 | 1 | XX:XX:00 | ↑ | | – |
| | NODE ID_022 | | XX:XX:00 | ↑ | | – |
| | ⋮ | | ⋮ | ⋮ | ⋮ | ⋮ |
| ⋮ | | | | | | |

OPERATIONS MANAGEMENT APPARATUS, OPERATIONS MANAGEMENT SYSTEM, AND OPERATIONS MANAGEMENT METHOD

CROSS-REFERENCE TO RELATED APPLICATION

This application is based upon and claims the benefit of priority of the prior Japanese Patent Application No. 2019-63280, filed on Mar. 28, 2019, the entire contents of which are incorporated herein by reference.

FIELD

The embodiments discussed herein are related to an operations management apparatus, an operations management system, and an operations management method.

BACKGROUND

Along with the expansion of the field of Internet of Things (IoT), a wide variety of devices have come to be coupled through a wide variety of communication methods. In such a situation, various failures (failures of hardware or software of devices and communication failures) could occur due to installed devices, utilized communication methods, surrounding radio conditions, utilized applications, and the like. For this reason, operations management techniques have become important in the IoT environments, which change from hour to hour.

Related techniques are disclosed in, for example, Japanese Laid-open Patent Publication Nos. 2016-162406 and 2008-15722.

SUMMARY

According to an aspect of the embodiments, an operations management apparatus includes: a memory; and a processor coupled to the memory, the processor being configured to execute an acquiring processing that includes acquiring operations management information in communications with one or more devices, execute a monitoring processing that includes monitoring conditions of the one or more devices by transmitting or receiving a condition monitoring packet to or from the one or more devices, execute a judging processing that includes judging whether the operations management information has been worsened at the time of transmitting or receiving the condition monitoring packet, and execute a determining processing that includes determining a method of transmitting or receiving the condition monitoring packet depending on a result of judgment made by the judging processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating tables for sensor measured values stored in a measured value database;

FIG. 4 is a diagram illustrating tables for operations management information stored in an operations management information database;

FIG. 5A is a diagram illustrating a case where acquisition of a sensor measured value is failed and FIG. 5B is a diagram illustrating a case where RSSI is below a threshold "−60";

FIG. 6 is a diagram illustrating a table for monitoring intervals stored in a monitoring management database;

FIG. 7 is a diagram illustrating a table of aggregation;

FIG. 8 is a diagram illustrating a list of supported protocols;

FIG. 11 is a diagram illustrating a table of the monitoring management database when a transmission interval and a transmission timing for a condition monitoring packet have been changed;

FIG. 13 is a diagram illustrating a table of aggregation;

FIG. 15 is a diagram illustrating a table of the monitoring management database when a transmission interval and a transmission timing for a condition monitoring packet have been changed;

FIG. 17 is a diagram illustrating the operations management information of the devices aggregated for each relay and for each protocol;

FIG. 19 is a diagram illustrating the presence or absence of an effect registered in the monitoring management database.

DESCRIPTION OF EMBODIMENT(S)

In the IoT operations management, to monitor the conditions of devices and perform abnormality detection, condition monitoring packets are transmitted and received by a method selected from a plurality of types. In the IoT environment, which changes from hour to hour, it is desirable to be able to perform abnormality detection by a method depending on changes in communication load.

In one aspect, the disclosure has an object to provide an operations management apparatus, an operations management system, and an operations management method that are capable of performing abnormality detection by a method depending on changes in communication load.

It is possible to perform abnormality detection by a method depending on a change in communication load.

Prior to explaining embodiments, an overview of operations management in the field of Internet of Things (IoT) will be described. Along with the expansion of the IoT, a wide variety of devices have come to be coupled through a wide variety of communication methods. In such a situation, various failures (failures of hardware or software of devices and communication failures) occur due to devices, utilized communication methods, peripheral wireless conditions, utilized applications, and the like. For this reason, in the IoT environments, which change from hour to hour, IoT operations management techniques have become important that monitor the conditions of devices and networks, detect occurrence of abnormality, identify the cause of the failure, and notify an operations manager of the cause and the like.

When detailed condition information on sensor nodes is collected with high frequency so as to detect occurrence of abnormality in real time and at the same time identify the cause of the failure, there is a problem that the communication load increases. In contrast, when only whether sensor nodes are alive or not is monitored without collecting detailed condition information so as not to increase the communication load, there is a possibility of failing to deal with a failure in real time. For this reason, it is important to provide a technology that achieves both abnormality detection and identification of the cause of a failure in real time while suppressing an increase in communication load by optimizing the condition information on sensor nodes to be collected, depending on the communication load changing from hour to hour.

Figure 1:
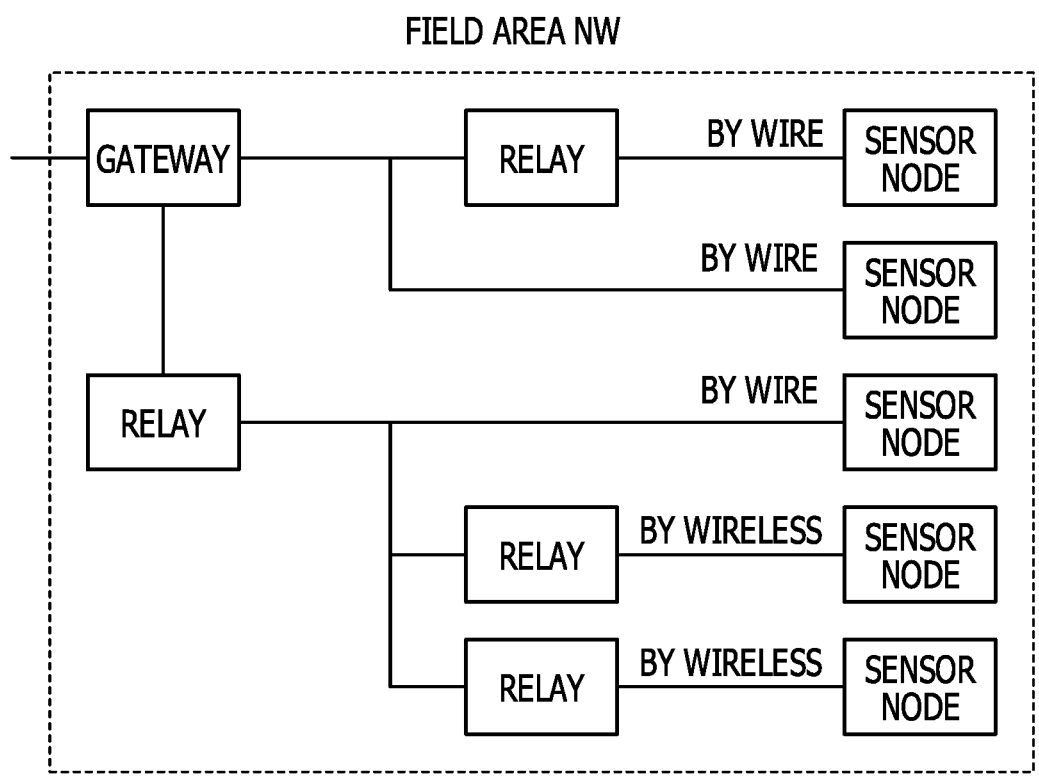
FIG. 1 is a diagram illustrating IoT field operations management.

FIG. 1 is a diagram illustrating IoT field operations management. As illustrated in FIG. 1, the devices include sensor nodes, relays, and the like. The gateway (GW) collects data from each sensor node in the field area network. For example, each sensor node transmits a sensor measured value to the gateway by wire through a relay or the like. Alternatively, each sensor node transmits a sensor measured value to the gateway wirelessly through a relay or the like.

In such an IoT field operations management, the gateway monitors the condition of each device. As methods of managing the condition of a device, there are a protocol in which the gateway requests the condition information and a protocol in which the device transmits the condition information. In the protocol in which the gateway requests the condition information, a condition monitoring packet is transmitted to a designated device at monitoring intervals designated for each protocol. In the protocol in which the device transmits the condition information, the gateway notifies a designated device of a designated monitoring interval. At the designated monitoring intervals, each device transmits a condition monitoring packet to the gateway.

The protocol in which the gateway requests the condition information includes Ping (Internet Control Message Protocol (ICMP)), Simple Network Management Protocol (SNMP), and the like. In the Ping method, the device transmits a ping packet to a sensor node, and determines the condition of the device (alive or not or the like) depending on the presence or absence of a response. This method is a method in which short packets are transmitted and received. For this reason, although the network load is low, the amount of information is small. In the SNMP method, a SNMP manager (gateway) requests management information base (MIB) (the central processing unit (CPU) or memory usage, the amount of traffic, and the like from an SNMP agent (device) to determine the detailed condition of the device. This method is capable of transmitting detailed information on the device. However, since the length of a packet is long, the network load is high.

The protocol in which the device transmits the condition information includes Link Layer Discovery Protocol (LLDP) and the like. In the LLDP method, the device transmits an LLDP packet (neighbor (neighboring device) information) to a multicast address at regular intervals, and the gateway receives the LLDP packet to determine the conditions including the coupling path of the device. This method is capable of transmitting detailed information on the device. However, since the length of a packet is long, the network load is high.

As described above, the methods of monitoring the condition of a device include one having a small amount of information and a low communication load, one having a large amount of information and a high communication load, and the like. It is desirable to be capable of monitoring a device while suppressing a communication load.

In the following embodiments, an operations management apparatus, an operations management system, and an operations management method will be described that are capable of performing abnormality detection by a method depending on changes in communication load in the IoT environment changing from hour to hour.

Embodiment 1

Figure 2:
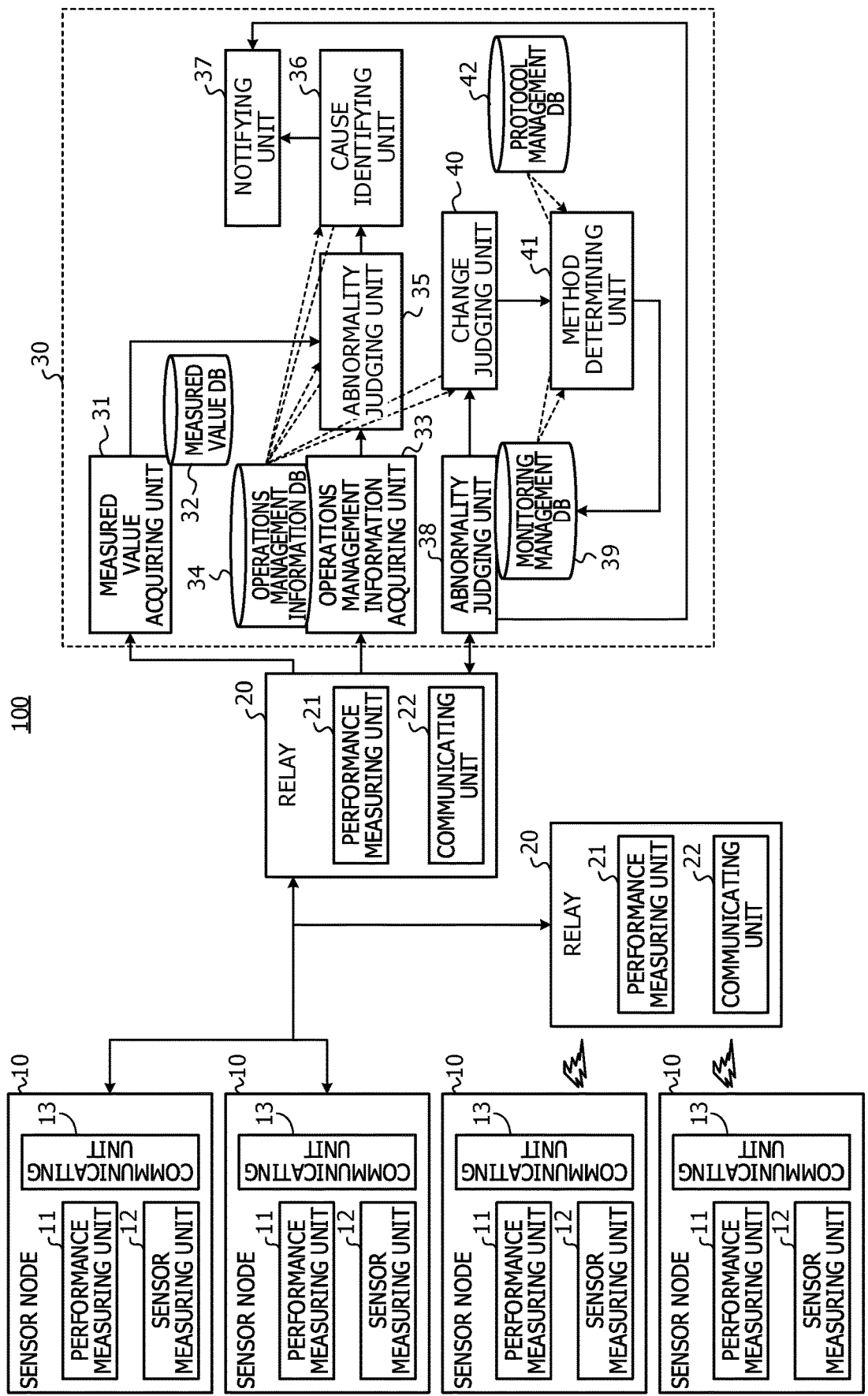
FIG. 2 is a diagram illustrating an overall configuration of an operations management system according to Embodiment 1.

FIG. 2 is a diagram illustrating an overall configuration of an operations management system 100 according to Embodiment 1. As illustrated in FIG. 2, the operations management system 100 includes one or more devices and a gateway 30. The one or more devices include sensor nodes 10, relays 20, and the like. For example, the sensor node 10 communicates with the relay 20 wirelessly. Alternatively, the sensor node 10 communicates with the relay 20 by wire. For example, the relay 20 communicates with the gateway 30 by wire.

The sensor node 10 includes a performance measuring unit 11, a sensor measuring unit 12, a communicating unit 13, and the like. The performance measuring unit 11 measures the performance of the sensor node 10 including the performance measuring unit 11 itself. The performance of the sensor node 10 includes operations management information to be described later, condition monitoring information of the sensor node 10, and the like. The sensor measuring unit 12 acquires a measuring result (a sensor measured value) of the sensor included in the sensor node 10. The communicating unit 13 transmits the performance measured by the performance measuring unit 11, the sensor measured value acquired by the sensor measuring unit 12, and the like to the relay 20. The communicating unit 13 transmits a condition monitoring packet to the gateway 30 through the relay 20 or receives a condition monitoring packet from the gateway 30 through the relay 20.

The relay 20 includes a performance measuring unit 21, a communicating unit 22, and the like. The performance measuring unit 21 measures the performance of the relay 20 including the performance measuring unit 21 itself. The communicating unit 22 transmits the performance measured by the performance measuring unit 21 to the gateway 30. The communicating unit 22 transmits data received from each sensor node 10 to the gateway 30. The communicating unit 22 transmits a condition monitoring packet to the gateway 30 or receives a condition monitoring packet from the gateway 30.

The gateway 30 includes a measured value acquiring unit 31, a measured value database 32, an operations management information acquiring unit 33, an operations management information database 34, an abnormality judging unit 35, a cause identifying unit 36, a notifying unit 37, a monitoring unit 38, a monitoring management database 39, a change judging unit 40, a method determining unit 41, a protocol management database 42, and the like.

The measured value acquiring unit 31 acquires the sensor measured value measured by the sensor measuring unit 12 of each sensor node 10 and stores the acquired sensor measured value in the measured value database 32. Every time the measured value acquiring unit 31 stores the sensor measured value in the measured value database 32, the measured value acquiring unit 31 notifies the abnormality judging unit 35 of the update of the measured value database 32. FIG. 3 is a diagram illustrating tables for sensor measured values stored in the measured value database 32. As illustrated in FIG. 3, the date and time (time stamp) of the measurement, each sensor measured value (the temperature, the humidity, the water level, and the amount of gas), and the like are stored while associated with the device ID for identifying each device. In the example of FIG. 3, the sensor measured values of the sensor nodes are illustrated.

The operations management information acquiring unit 33 acquires the operations management information measured by the performance measuring unit 11 of each sensor node 10, the operations management information measured by the performance measuring unit 21 of each relay 20, and the operations management information of the gateway 30, and stores the operations management information in the operations management information database 34. The operations management information acquiring unit 33 also measures the operations management information of the gateway 30, and stores the operations management information in the operations management information database 34. The operations management information measured by the sensor node 10 includes operations management information indicating the communication quality of the sensor node 10, operations management information indicating the condition (terminal quality) of hardware and software of the sensor node 10, and the like. The operations management information measured by the relay 20 includes operations management information indicating the terminal quality of the relay 20 and the like. Every time the operations management information acquiring unit 33 stores operations management information in the operations management information database 34, the operations management information acquiring unit 33 notifies the abnormality judging unit 35 of the update of the operations management information database 34. The operations management information measured by the gateway 30 includes operations management information indicating the terminal quality of the gateway 30 and the like. FIG. 4 is a diagram illustrating tables for operations management information stored in the operations management information database 34. As illustrated in FIG. 4, the date and time (time stamp) of the acquisition, the operations management information, and the like are stored while associated with the device ID. The operations management information indicating the communication quality includes parameters such as the received signal strength Indicator (RSSI), the link quality (LQ), the response time, the packet error rate (PER), the number of retransmissions, the channel utilization, and the number of active nodes. The operations management information indicating the terminal quality includes parameters such as the remaining battery, the CPU usage, the memory usage, the hard disk drive (HDD) usage, the device internal temperature, and the internal processing time. The operations management information acquiring unit 33 may acquire operations management information indicating the communication quality the relay 20 is capable of observing.

Upon receipt of the update notification of the measured value database 32 from the measured value acquiring unit 31, the abnormality judging unit 35 acquires the latest data of the measured value database 32 and judges whether or not there is abnormality. This allows the abnormality judging unit 35 to judge whether or not there is abnormality for all the sensor measured values acquired by the measured value acquiring unit 31. Upon receipt of the update notification of the operations management information database 34 from the operations management information acquiring unit 33, the abnormality judging unit 35 acquires the latest data of the operations management information database 34 and judges whether or not there is abnormality. This allows the abnormality judging unit 35 to judge whether or not there is abnormality for all the operations management information acquired by the operations management information acquiring unit 33. When detecting occurrence of abnormality, the abnormality judging unit 35 notifies the cause identifying unit 36 of the occurrence of abnormality and passes the original data judged to be abnormal (the sensor measured value or the operations management information) to the cause identifying unit 36. For example, the abnormality judging unit 35 passes the device ID, the time stamp, the data name, and the data value of the corresponding data to the cause identifying unit 36.

The criteria for judging the occurrence of abnormality include failure to acquire the sensor measured value or the operations management information, the operations management information exceeding a threshold, reception of an error message, and the like. It is possible to acquire a plurality of pieces of the latest data in time series from the measured value database 32 or the operations management information database 34, calculate a feature quantity such as an average value or a variance value, and judge whether or not the feature quantity exceeds a threshold. FIG. 5A illustrates an example where acquisition of a sensor measured value is failed at the measured value database 32. FIG. 5B illustrates an example where the RSSI is below a threshold "−60" at the operations management information database 34.

Upon receipt of the notification of occurrence of abnormality from the abnormality judging unit 35, the cause identifying unit 36 acquires one or more pieces of the latest data from the operations management information database 34 for the device ID of the original data judged to be abnormal, and analyzes the acquired data to identify the cause of the occurrence of abnormality. In the case of successfully identifying the cause, the cause identifying unit 36 notifies the notifying unit 37 of the content of the failure (the device ID, the date and time of occurrence of abnormality, the cause of the occurrence of abnormality).

The number of pieces of the latest data acquired by the cause identifying unit 36 from the operations management information database 34 may be X pieces immediately before the time stamp of the original data judged to have the occurrence of abnormality or X pieces around the time stamp of the original data judged to have the occurrence of abnormality. X may be changed depending on the cycle of change of data, the amount of change of data, or the like. For example, regarding the operations management information indicating the communication quality, it is desirable to acquire a larger number of pieces of the latest data (for example, 50 pieces) because the operations management information changes greatly at random. Regarding the operations management information indicating the terminal quality, it is desirable to acquire a small number of pieces of the latest data (for example, 10 pieces) because the operations management information tends to change linearly. As the analyzing method, an existing method (comparison of an average, a median value, a variance value, a feature quantity, excess of a threshold, cluster analysis, trend analysis, learning pattern at the normal condition, comparison with a cluster, or the like) may be utilized.

The notifying unit 37 notifies a notification destination of the content of the failure (the device ID, the date and time of occurrence of abnormality, the cause of the occurrence of abnormality) received from the cause identifying unit 36. The notification destination may be a system operation application, a visualization application, a system manager, a system user, or the like. The above-described configuration makes it possible to notify the notification destination of the content of the failure based on the sensor measured values or the operations management information.

The monitoring unit 38 acquires device information for each protocol from the monitoring management database 39 and acquires a monitoring interval (transmission interval) for each protocol. FIG. 6 is a diagram illustrating a table for monitoring intervals stored in the monitoring management database 39. For example, the sensor node of the device ID_001 uses the SNMP protocol in which the monitoring interval is set to 10 seconds for transmission of a condition monitoring packet. The sensor node of the device ID_021 uses the Ping protocol in which the monitoring interval is set to 1 second for transmission of a condition monitoring packet.

When the gateway 30 transmits a condition monitoring packet to the sensor node 10, the monitoring unit 38 transmits a condition monitoring packet to the designated sensor node 10 at designated monitoring intervals for each protocol. The designated sensor node 10 receives the condition monitoring packet. When the sensor node 10 transmits a condition monitoring packet to the gateway 30, the monitoring unit 38 notifies the designated sensor node 10 of a designated monitoring interval for each protocol. The sensor node 10 transmits the condition monitoring packet at the designated monitoring intervals. The monitoring unit 38 transmits a condition monitoring packet to each sensor node 10 or receives a condition monitoring packet from each sensor node 10. The monitoring unit 38 notifies the change judging unit 40 that the monitoring unit 38 has transmitted the condition monitoring packet to each sensor node 10 or that the monitoring unit 38 has received the condition monitoring packet from each sensor node 10.

Next, an example of determining a method of transmitting and receiving a condition monitoring packet depending on a change in the operations management information indicating the communication quality will be described. The monitoring unit 38 notifies the change judging unit 40 that the monitoring unit 38 has transmitted the condition monitoring packet to the sensor node 10 or that the monitoring unit 38 has received the condition monitoring packet from the sensor node 10.

The change judging unit 40 receives from the monitoring unit 38 the notification that the monitoring unit 38 has transmitted the condition monitoring packet to the sensor node 10 or that the monitoring unit 38 has received the condition monitoring packet from the sensor node 10. At this reception timing, the change judging unit 40 acquires, from the operations management information database 34, operations management information indicating the communication quality for the corresponding sensor node 10 which was collected before this reception timing, and judges a change in the operations management information indicating the communication quality (worsened, unchanged, or improved) for each sensor node 10. The change judging unit 40 acquires the protocol of the corresponding sensor node 10 from the monitoring management database 39 and aggregates changes in the operations management information of the sensor nodes 10 for each protocol. FIG. 7 is a diagram illustrating a table of aggregation. The change judging unit 40 judges a change (worsened, unchanged, or improved) in the operations management information at the time of condition monitoring and notifies the method determining unit 41 of the judgment. For example, the change judging unit 40 may judge that the operations management information has been "worsened" when any one parameter has been worsened, or may make judgment by majority among worsened parameters, unchanged parameters, and improved parameters. In FIG. 7, "×", "–", and "○" represent worsened, unchanged, and improved, respectively.

As the analyzing method for a change in the operations management information indicating the communication quality, an existing method (comparison of an average, a median value, a variance value, a feature quantity, excess of a threshold, cluster analysis, trend analysis, gradient of approximation straight line, or the like) may be utilized. For example, regarding RSSI, LQ, or the like, it may be judged that the parameter is worsened when the value tends to decrease. Regarding the response time, PER, the number of retransmissions, the channel utilization, the number of active nodes, or the like, it may be judged that the parameter is worsened when the value tends to increase.

The judgment on a change in the operations management information indicating the communication quality at the time of condition monitoring may be performed every time a condition monitoring packet is transmitted or received, or multiple times of judgment may be performed at once. The judgment on a change in the operations management information at the time of condition monitoring may be made such that the operations management information is judged to be "worsened" when even only one device has been "worsened" or the judgment may be made by majority among worsened parameters, unchanged parameters, and improved parameters.

The method determining unit 41 receives the change in the operations management information at the time of condition monitoring from the change judging unit 40. When the change is worsened, the method determining unit 41 acquires, from the monitoring management database 39, a list of devices the conditions of which are monitored utilizing the corresponding protocols and judges whether or not there is any device supporting a plurality of protocols among the devices. FIG. 8 is a diagram illustrating a list of supported protocols. For example, the sensor node 10 of the device ID of node ID_001 supports two types of protocols, that is, the SNMP protocol and the Ping protocol. When there is a device supporting a plurality of protocols, the method determining unit 41 acquires a change in the operations management information indicating the communication quality at the time of condition monitoring for a protocol other than those being used. When the change is other than worsened, the method determining unit 41 changes the protocol for condition monitoring for the device and registers the protocol in the monitoring management database 39. The list of protocols supported by each device may be registered manually in advance, or a supported protocol may be registered when a response is received from a new device after transmitting a protocol command from the gateway 30 at the time of coupling the new device.

Figure 9:
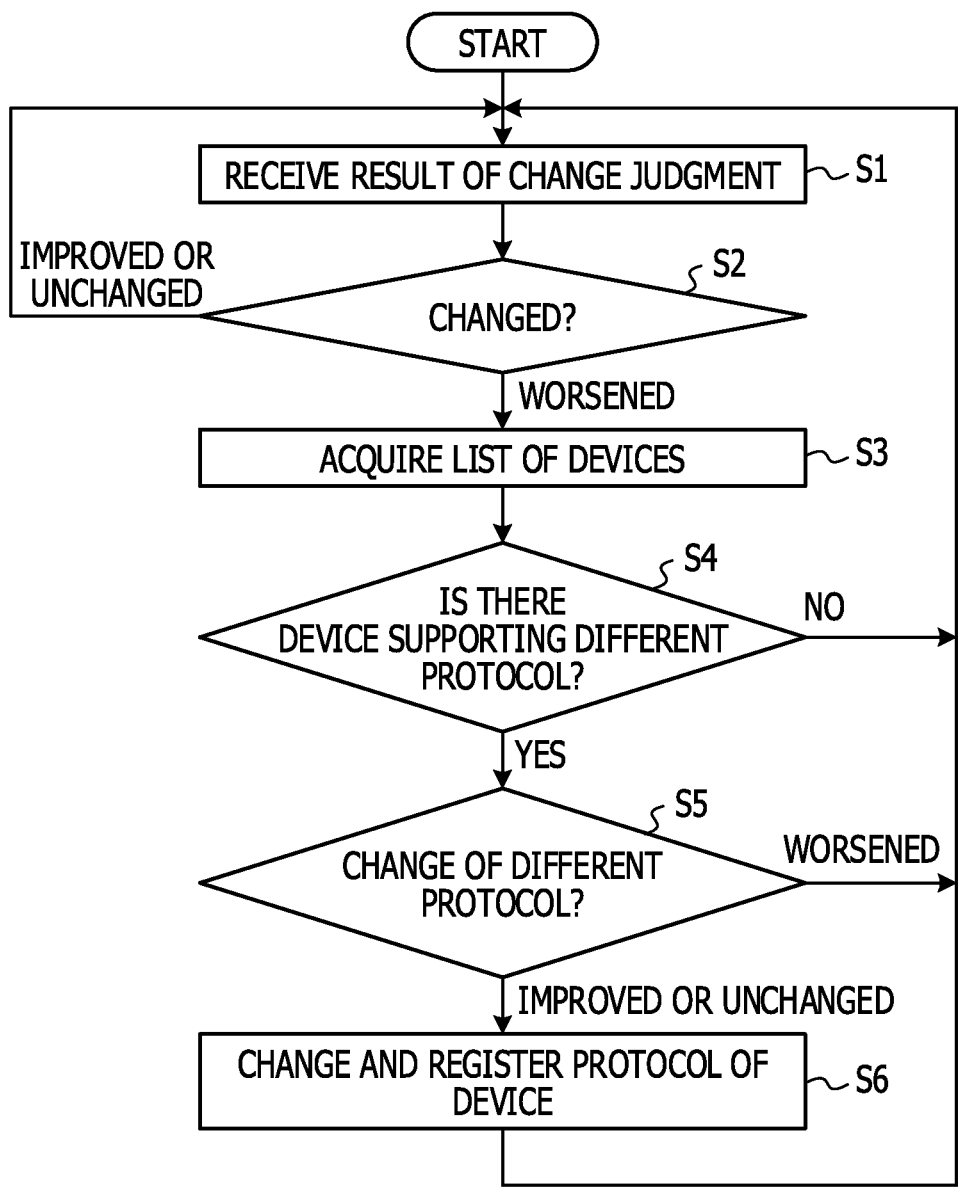
FIG. 9 is a diagram illustrating a flowchart executed by the operations management system.

FIG. 9 is a diagram illustrating a flowchart executed by the operations management system 100 to determine a method of transmitting and receiving a condition monitoring packet depending on a change in the operations management information indicating the communication quality. As illustrated in FIG. 9, every time the change judging unit 40 judges a change in the operations management information indicating the communication quality, the method determining unit 41 receives the result of the judgment from the change judging unit 40 (step S1). Next, the method determining unit 41 judges whether the result of the judgment is worsened, unchanged, or improved (step S2). When the result of the judgment is "unchanged" or "improved", the processing is executed again from step S1.

When the result of the judgment is "worsened", the method determining unit 41 acquires a list of devices the conditions of which are monitored utilizing the protocol from the monitoring management database 39 (step S3). Next, the method determining unit 41 judges whether or not there is a device supporting a different protocol among the devices (step S4). When the judgment is "No" in step S4, the processing is executed again from step S1.

When the judgment is "Yes" in step S4, the method determining unit 41 acquires, from the monitoring management database 39, a change in the operations management information indicating the communication quality at the time of condition monitoring for the different protocol. The method determining unit 41 judges whether the change is worsened, unchanged, or improved (step S5). When the judgment is "worsened" in step S5, the processing is executed again from step S1. When the judgment is "unchanged" or "improved" in step S5, the protocol of the sensor node 10 is changed to the different protocol and is registered in the monitoring management database 39 (step S6).

According to the present embodiment, it is determined whether or not the operations management information indicating the communication quality is worsened at the time of transmitting and receiving a condition monitoring packet. Depending on the result of the judgment, the method of transmitting and receiving a condition monitoring packet is determined. Judging whether or not the operations management information indicating the communication quality is worsened makes it possible to judge a change in communication load. Hence, in the IoT environment, which changes from hour to hour, it is possible to perform abnormality detection by a method depending on a change in communication load. For example, by changing the method of transmitting and receiving a condition monitoring packet when the operations management information indicating the communication quality is worsened, it is possible to change the method of transmitting and receiving a condition monitoring packet when the communication load increases. For example, by selecting a protocol that reduces the communication load, it is possible to suppress the communication load.

Embodiment 2

Figure 10:
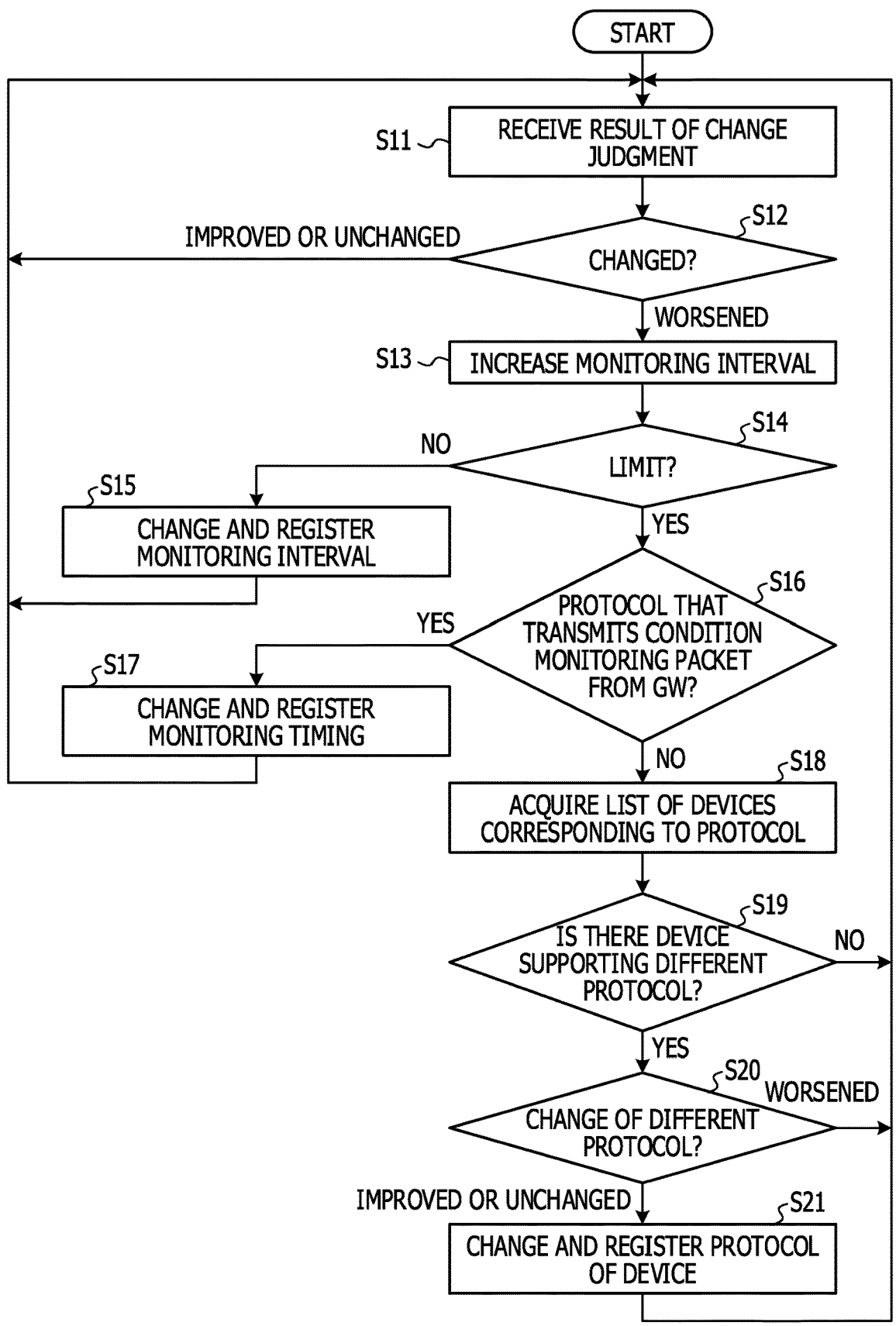
FIG. 10 is a diagram illustrating a flowchart executed by the operations management system.

In Embodiment 2, an example of changing the transmission interval or the transmission timing for a condition monitoring packet before switching the protocol will be described. FIG. 10 is a diagram illustrating a flowchart executed by the operations management system 100 in the present embodiment. As illustrated in FIG. 10, every time the change judging unit 40 judges a change in the operations management information indicating the communication quality, the method determining unit 41 receives the result of the judgment from the change judging unit 40 (step S11). Next, the method determining unit 41 judges whether the result of the judgment is worsened, unchanged, or improved (step S12). When the result of the judgment is "unchanged" or "improved", the processing from step S11 is executed again.

When the judgment is "worsened" in step S12, the method determining unit 41 calculates a value obtained by increasing the monitoring interval of the used protocol by a predetermined time (for example, 1 second) (step S13). Next, the method determining unit 41 judges whether or not the calculated monitoring interval has reached a predetermined limit (step S14). When the judgment is "No" in step S14, the method determining unit 41 changes the monitoring interval of the monitoring management database 39 to the calculated monitoring interval (step S15). Thereafter, the processing is executed again from step S11.

When the judgment is "Yes" in step S14, the method determining unit 41 judges whether or not the protocol that transmits a condition monitoring packet from the gateway 30 to the sensor node 10 has been used (step S16). When the judgment is "Yes" in step S16, the timing of transmitting a condition monitoring packet is shifted and changed (step S17). Thereafter, the processing is executed again from step S11. FIG. 11 is a diagram illustrating a table of the monitoring management database 39 when the transmission interval and the transmission timing for a condition monitoring packet have been changed.

When the judgment is "No" in step S16, the method determining unit 41 acquires a list of devices the conditions of which are monitored utilizing the protocol from the monitoring management database 39 (step S18). Next, the method determining unit 41 judges whether or not there is a device supporting a different protocol among the devices (step S19). When the judgment is "No" in step S19, the processing is executed again from step S11.

When the judgment is "Yes" in step S19, the method determining unit 41 acquires, from the monitoring management database 39, a change in the operations management information at the time of condition monitoring for the different protocol. The method determining unit 41 judges whether the change is worsened, unchanged, or improved (step S20). When the judgment is "worsened" in step S20, the processing is executed again from step S11. When the judgment is "unchanged" or "improved" in step S20, the protocol of the device is changed to the different protocol and is registered in the monitoring management database 39 (step S21).

According to the present embodiment, it is possible to suppress degradation of the communication quality by changing the transmission timing or the transmission interval for transmitting and receiving a condition monitoring packet. When it is possible to suppress degradation of the communication quality without changing the protocol, it is possible to suppress a decrease in the amount of information, which would be caused by the change of the protocol.

The interval and the limit for the extending of the monitoring interval may be changed for each protocol. When a change in the operations management information at the time of condition monitoring has been improved, the interval may be shortened.

Embodiment 3

Figure 12:
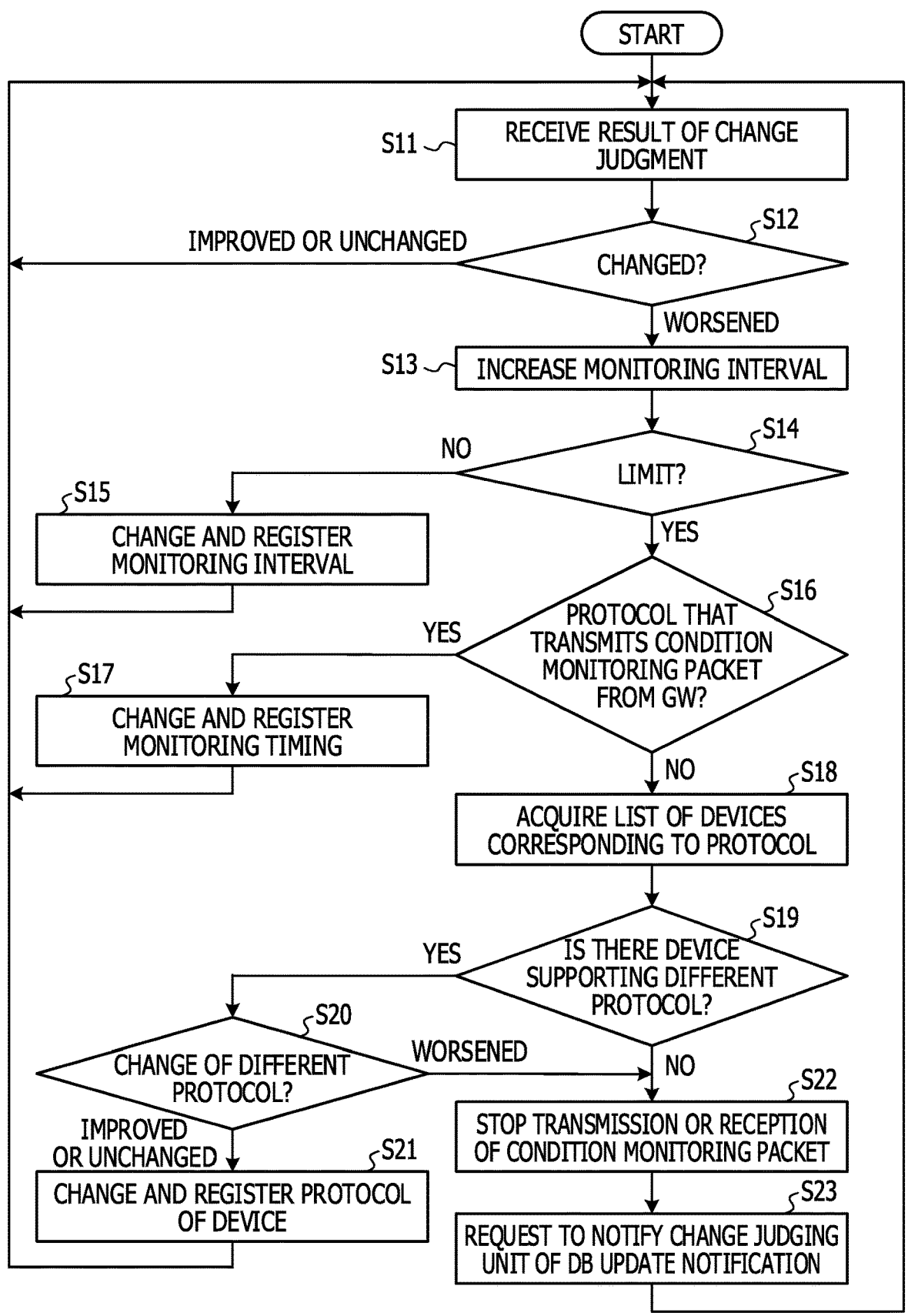
FIG. 12 is a diagram illustrating a flowchart executed by the operations management system.

In Embodiment 3, the case where the transmission of a condition monitoring packet is stopped when there is no protocol to be changed will be described. FIG. 12 is a diagram illustrating a flowchart executed by the operations management system 100 in the present embodiment. As illustrated in FIG. 12, the same processing as in FIG. 10 is performed in steps S11 to S21.

When the judgment is "No" in step S19 or when the judgment is "worsened" in step S20, the monitoring unit 38 stops the transmission and reception of a condition monitoring packet (step S22). Next, the method determining unit 41 requests the measured value acquiring unit 31 and the operations management information acquiring unit 33 to also notify the change judging unit 40 of the notification of the update of the respective databases (step S23). Thereafter, the processing is executed again from step S11.

According to the present embodiment, the transmission and reception of a condition monitoring packet are stopped when only a protocol that worsens the operations management information indicating the communication quality is allowed to be selected. In this case, by causing the measured value acquiring unit 31 and the operations management information acquiring unit 33 to notify the change judging unit 40 of the notification of the update of the databases, it is possible to use the sensor measured value and the operations management information for monitoring the condition of each device instead of a condition monitoring packet.

Embodiment 4

In Embodiment 4, an example of taking into consideration a change in the operations management information indicating the terminal quality will be described. In the present embodiment, the change judging unit 40 receives from the monitoring unit 38 the notification that the monitoring unit 38 has transmitted the condition monitoring packet to the device or that the monitoring unit 38 has received the condition monitoring packet from the device. At this reception timing, the change judging unit 40 acquires, from the operations management information database 34, operations management information indicating the terminal quality for the corresponding device which was collected before this reception timing, and judges a change in the operations management information indicating the terminal quality (worsened, unchanged, or improved) for each device. The change judging unit 40 acquires the protocol of the corresponding device from the monitoring management database 39 and aggregates changes in the operations management information of the devices for each protocol. The change judging unit 40 judges a change (worsened, unchanged, or improved) in the operations management information at the time of condition monitoring and notifies the method determining unit 41 of the judgment. FIG. 13 is a diagram illustrating a table of aggregation. The change judging unit 40 judges a change (worsened, unchanged, or improved) in the operations management information at the time of condition monitoring and notifies the method determining unit 41 of the judgment.

Figure 14:
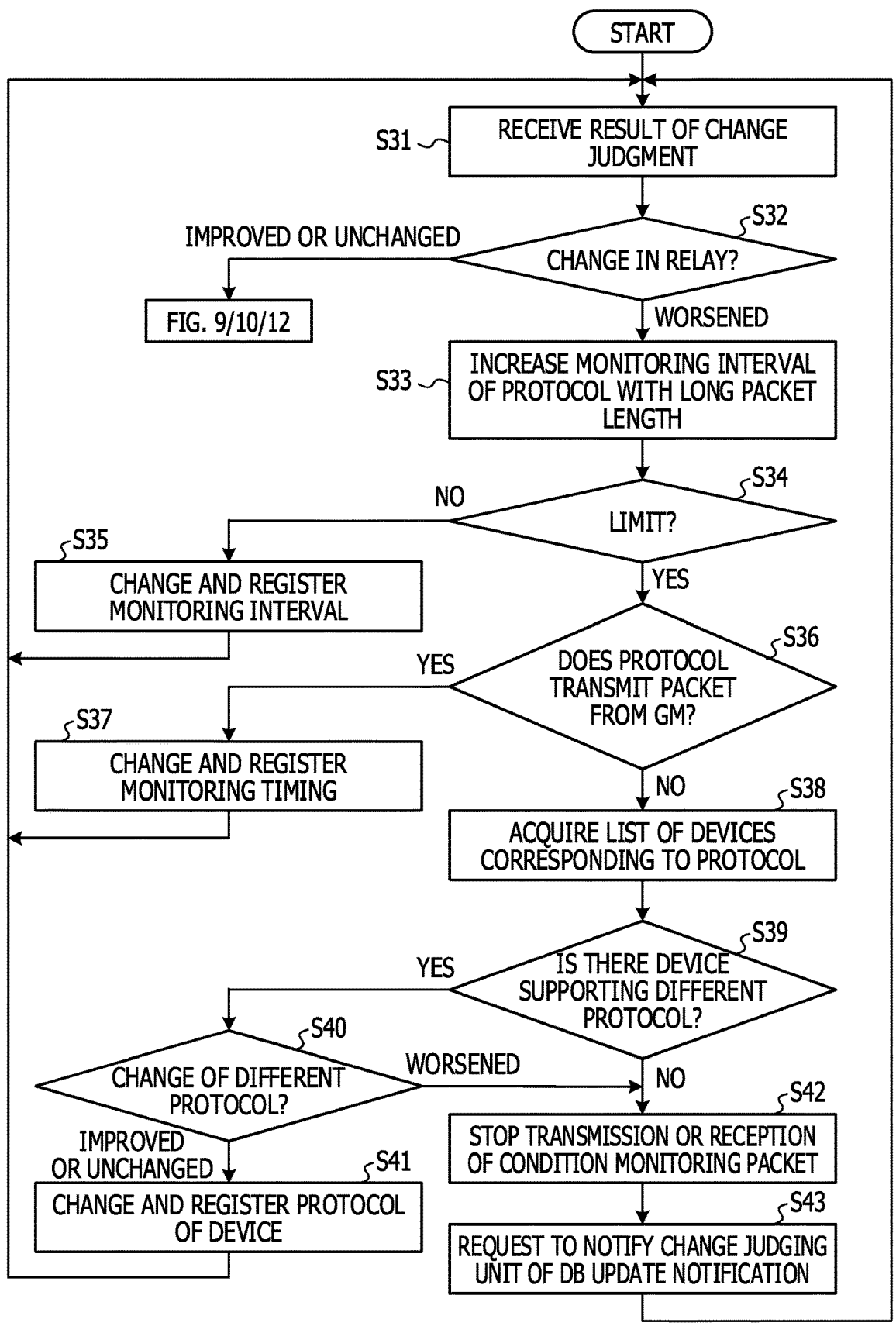
FIG. 14 is a diagram illustrating a flowchart executed by the operations management system.

FIG. 14 is a diagram illustrating a flowchart executed by the operations management system 100 in the present embodiment. As illustrated in FIG. 14, every time the change judging unit 40 judges a change in the operations management information indicating the terminal quality for each of the relays 20, the sensor nodes 10, and the gateway 30, the method determining unit 41 receives the result of the judgment from the change judging unit 40 (step S31). When the change judging unit 40 has judged a change in the operations management information indicating the terminal quality for the relay 20, the method determining unit 41 judges whether the result of the judgment is worsened, unchanged, or improved (step S32).

When the result of the determination is "worsened", the method determining unit 41 calculates a value obtained by increasing the monitoring interval of the protocol with a long packet length by a predetermined time (for example, 1 second) (step S33). Next, the method determining unit 41 judges whether or not the calculated monitoring interval has reached a predetermined limit (step S34). When the judgment is "No" in step S34, the method determining unit 41 changes the monitoring interval of the monitoring management database 39 to the calculated monitoring interval (step S35). Thereafter, the processing is executed again from step S31.

When the judgment is "Yes" in step S34, the method determining unit 41 judges whether or not the protocol that transmits a condition monitoring packet from the gateway 30 to the sensor node 10 has been used (step S36). When the judgment is "Yes" in step S36, the timing of transmitting a condition monitoring packet is shifted and changed for the protocol (step S37). Thereafter, the processing is executed again from step S31. FIG. 15 is a diagram illustrating a table of the monitoring management database 39 when the transmission interval and the transmission timing for a condition monitoring packet have been changed.

When the judgment is "No" in step S36, the method determining unit 41 acquires a list of devices the conditions of which are monitored utilizing the protocol from the monitoring management database 39 (step S38). Next, the method determining unit 41 judges whether or not there is a device supporting a different protocol among the devices (step S39). When the judgment is "Yes" in step S39, the method determining unit 41 acquires, from the monitoring management database 39, a change in the operations management information indicating the communication quality at the time of condition monitoring for the different protocol. The method determining unit 41 judges whether the change is worsened, unchanged, or improved (step S40). When the judgment is "unchanged" or "improved" in step S40, the protocol of the device is changed to the different protocol and is registered in the monitoring management database 39 (step S41). Thereafter, the processing is executed again from step S31.

When the judgment is "No" in step S39 or when the judgment is "worsened" in step S40, the monitoring unit 38 stops the transmission and reception of a condition monitoring packet (step S42). Next, the method determining unit 41 requests the measured value acquiring unit 31 and the operations management information acquiring unit 33 to also notify the change judging unit 40 of the notification of the update of the respective databases (step S43). Thereafter, the processing is executed again from step S31.

When the judgment is "unchanged" or "improved" in step S32, the processing of any of Embodiments 1 to 3 is executed. In the example of FIG. 14, when the change judging unit 40 judges a change in the operations management information indicating the terminal quality for the relay 20 in step S31, step S32 is executed; however, when the change judging unit 40 judges a change in the operations management information indicating the terminal quality for the sensor node 10, a different flowchart (FIG. 16) may be executed.

Figure 16:
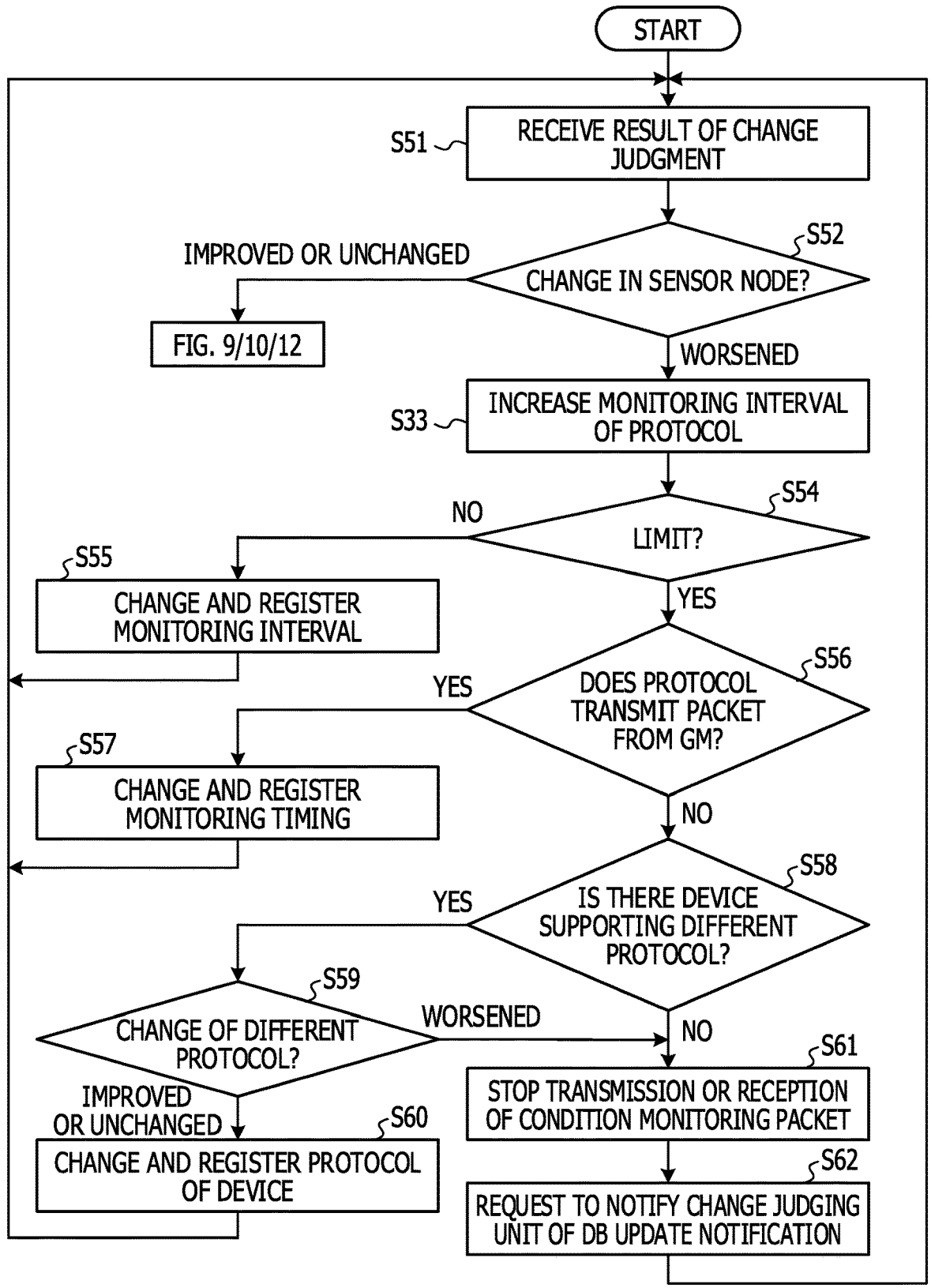
FIG. 16 is a diagram illustrating a flowchart executed by the operations management system.

FIG. 16 is a diagram illustrating the different flowchart executed by the operations management system 100 in the present embodiment. As illustrated in FIG. 16, every time the change judging unit 40 judges a change in the operations management information indicating the terminal quality for the sensor node 10, the method determining unit 41 receives the result of the judgment from the change judging unit 40

(step S51). Next, the method determining unit 41 judges whether the result of the judgment is worsened, unchanged, or improved (step S52).

When the result of the determination is "worsened", the method determining unit 41 calculates a value obtained by increasing the monitoring interval of the protocol used by the device by a predetermined time (for example, 1 second) (step S53). Next, the method determining unit 41 judges whether or not the calculated monitoring interval has reached a predetermined limit (step S54). When the judgment is "No" in step S54, the method determining unit 41 changes the monitoring interval of the monitoring management database 39 to the calculated monitoring interval (step S55). Thereafter, the processing is executed again from step S51.

When the judgment is "Yes" in step S54, the method determining unit 41 judges whether or not the protocol that transmits a condition monitoring packet from the gateway 30 to the sensor node 10 has been used (step S56). When the judgment is "Yes" in step S56, the timing of transmitting a condition monitoring packet is shifted and changed (step S57). Thereafter, the processing is executed again from step S51.

When the judgment is "No" in step S56, the method determining unit 41 judges whether or not there is a device supporting a different protocol among the devices (step S58). When the judgment is "Yes" in step S58, the method determining unit 41 acquires, from the monitoring management database 39, a change in the operations management information indicating the communication quality at the time of condition monitoring for the different protocol. The method determining unit 41 judges whether the change is worsened, unchanged, or improved (step S59). When the judgment is "unchanged" or "improved" in step S59, the protocol of the device is changed to the different protocol and is registered in the monitoring management database 39 (step S60). Thereafter, the processing is executed again from step S51.

When the judgment is "No" in step S58 or when the judgment is "worsened" in step S59, the monitoring unit 38 stops the transmission and reception of a condition monitoring packet (step S61). Next, the method determining unit 41 requests the measured value acquiring unit 31 and the operations management information acquiring unit 33 to also notify the change judging unit 40 of the notification of the update of the respective databases (step S62). Thereafter, the processing is executed again from step S51.

When the judgment is "unchanged" or "improved" in step S52, the processing of any of Embodiments 1 to 3 is executed.

According to the present embodiment, it is determined whether or not the operations management information indicating the terminal quality is worsened at the time of transmitting and receiving a condition monitoring packet. Depending on the result of the judgment, the method of transmitting and receiving a condition monitoring packet is determined. Judging whether or not the operations management information indicating the terminal quality is worsened makes it possible to judge a change in terminal load. Hence, in the IoT environment, which changes from hour to hour, it is possible to perform abnormality detection by a method depending on a change in terminal load. For example, by changing the method of transmitting and receiving a condition monitoring packet when the operations management information indicating the terminal quality is worsened, it is possible to change the method of transmitting and receiving a condition monitoring packet when the terminal load increases. For example, by selecting a protocol that reduces the terminal load, it is possible to suppress the terminal load.

Embodiment 5

In Embodiment 5, an example of aggregating changes in the operations management information of devices for each relay and for each protocol will be described. In the present embodiment, the change judging unit 40 aggregates the operations management information of devices for each relay and for each protocol, judges changes in the operations management information at the time of condition monitoring, and notifies the method determining unit 41 of the result of the judgment. FIG. 17 is a diagram illustrating the operations management information of the devices aggregated for each relay and for each protocol.

Figure 18A:
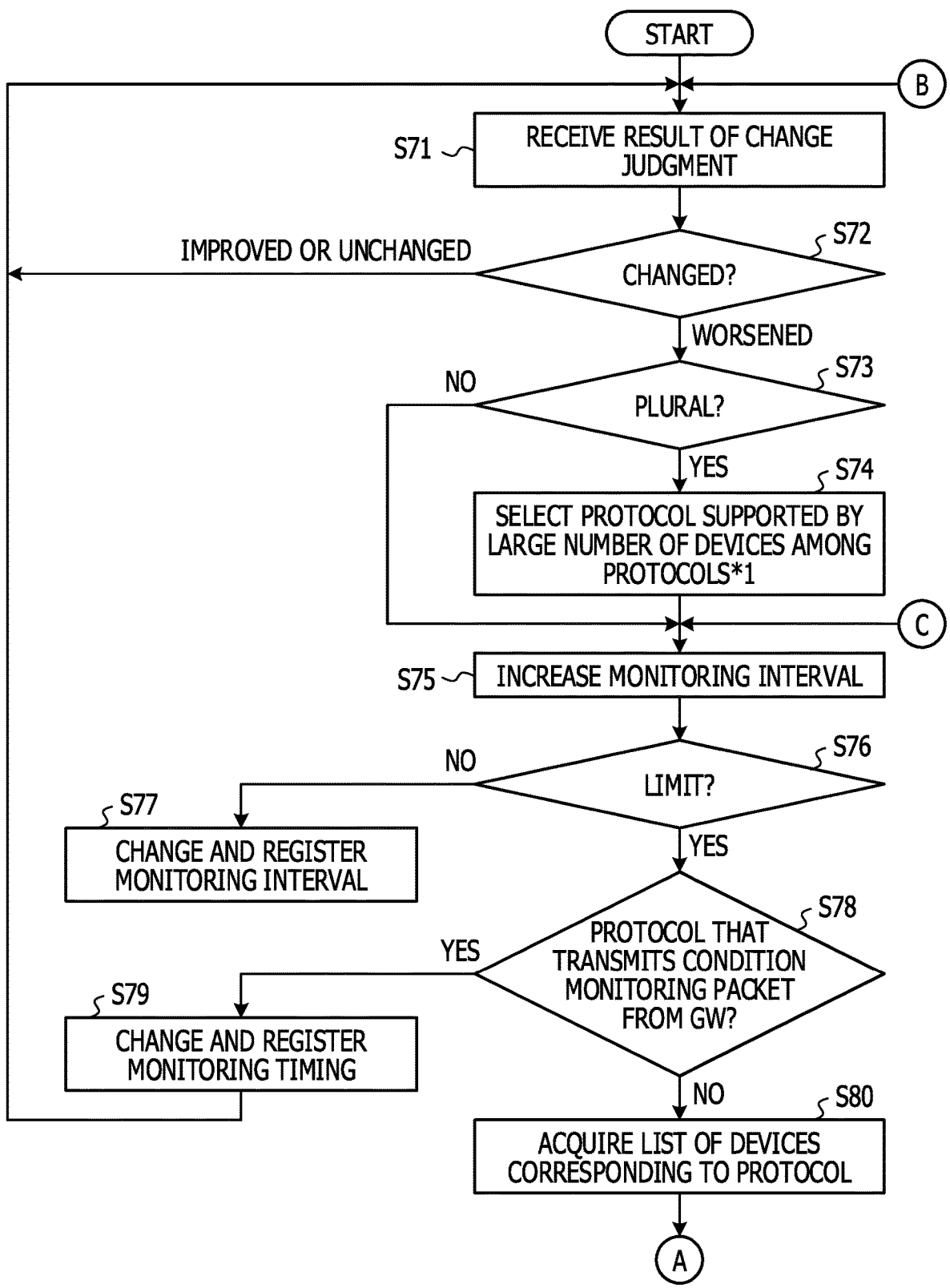
FIGS. 18A and 18B are a diagram illustrating a flowchart executed by the operations management system.
Figure 18B:
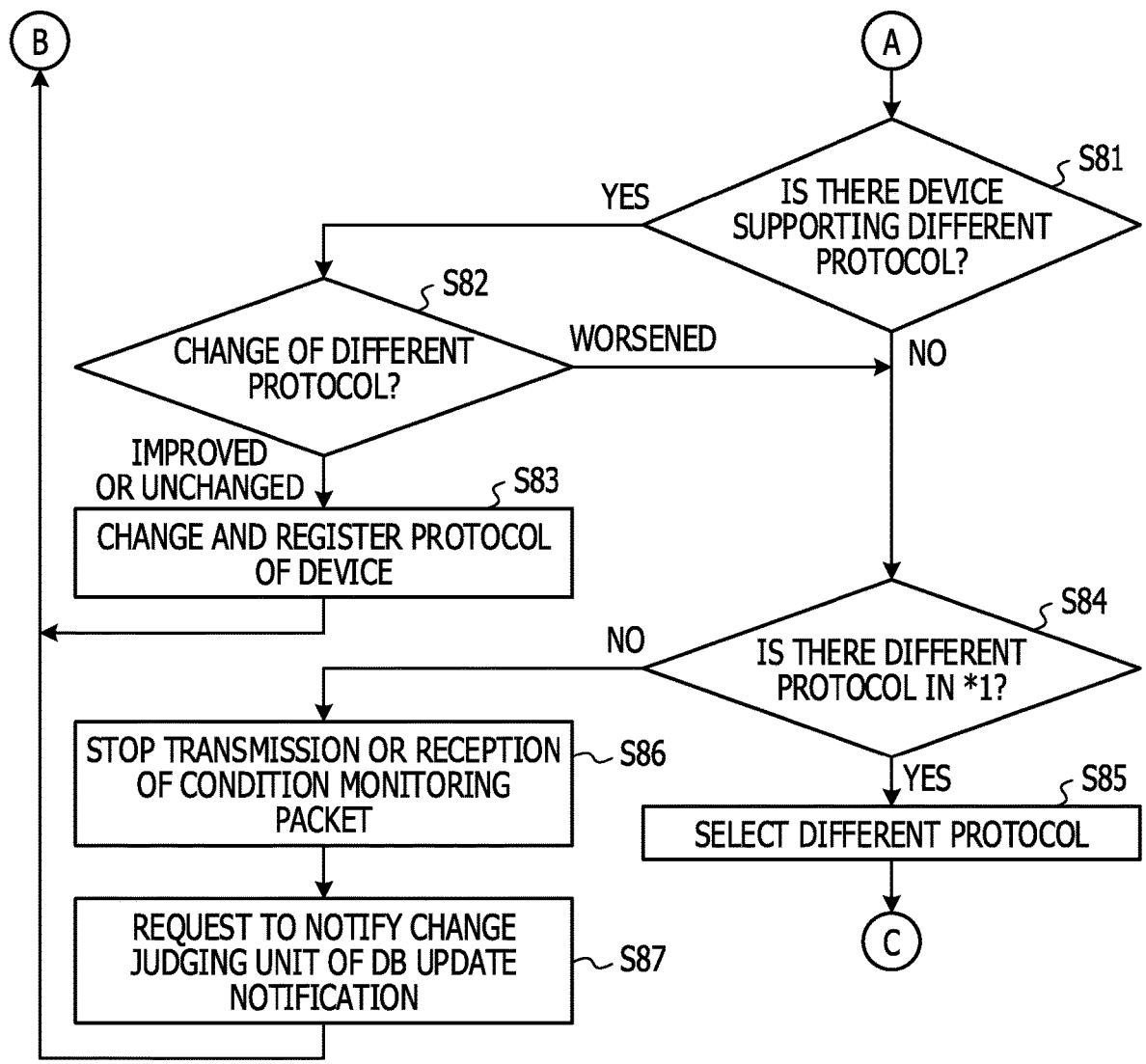

FIG. 18 (i.e., FIGS. 18A and 18B) is a diagram illustrating a flowchart executed by the operations management system 100 in the present embodiment. As illustrated in FIG. 18, every time the change judging unit 40 judges a change in the operations management information indicating the terminal quality, the method determining unit 41 receives the result of the judgment from the change judging unit 40 (step S71). Next, the method determining unit 41 judges whether the result of the judgment is worsened, unchanged, or improved (step S72). When the result of the judgment is "unchanged" or "improved", the processing is executed again from step S71.

When the judgment is "worsened" in step S72, the method determining unit 41 judges whether or not there are a plurality of protocols judged to be worsened (step S73). When the judgment is "Yes" in step S73, the method determining unit 41 selects a protocol supported by a large number of devices among the plurality of protocols (step S74). When the judgment is "No" in step S73 or after the execution of step S74, the method determining unit 41 calculates a value obtained by increasing the monitoring interval of one of the protocols determined to be worsened or the protocol selected in step S74 by a predetermined time (for example, 1 second) (step S75). Next, the method determining unit 41 judges whether or not the calculated monitoring interval has reached a predetermined limit (step S76). When the judgment is "No" in step S76, the method determining unit 41 changes the monitoring interval of the monitoring management database 39 to the calculated monitoring interval (step S77). Thereafter, the processing is executed again from step S71.

When the judgment is "Yes" in step S76, the method determining unit 41 judges whether or not the protocol that transmits a condition monitoring packet from the gateway 30 to the sensor node 10 has been used (step S78). When the judgment is "Yes" in step S78, the timing of transmitting a condition monitoring packet is shifted and changed (step S79). Thereafter, the processing is executed again from step S71.

When the judgment is "No" in step S78, the method determining unit 41 acquires a list of devices the conditions of which are monitored utilizing the protocol from the monitoring management database 39 (step S80). Next, the method determining unit 41 judges whether there is a device supporting a different protocol among the devices (step S81).

When the judgment is "Yes" in step S81, the method determining unit 41 acquires, from the monitoring management database 39, a change in the operations management information indicating the communication quality at the time of condition monitoring for the different protocol. The method determining unit 41 judges whether the change is worsened, unchanged, or improved (step S82). When the judgment is "unchanged" or "improved" in step S82, the protocol of the device is changed to the different protocol and is registered in the monitoring management database 39 (step S83). Thereafter, the processing is executed again from step S71.

When the judgment is "No" in step S81 or when the judgment is "worsened" in step S82, the method determining unit 41 judges whether or not there is any protocols not selected in step S74 (step S84). When the judgment is "Yes" in step S84, the method determining unit 41 selects any of the protocols not selected in step S74 (step S85). Thereafter, the processing is executed again from step S75.

When the judgment is "No" in step S84, the monitoring unit 38 stops the transmission and reception of a condition monitoring packet (step S86). Next, the method determining unit 41 requests the measured value acquiring unit 31 and the operations management information acquiring unit 33 to also notify the change judging unit 40 of the notification of the update of the respective databases (step S87). Thereafter, the processing is executed again from step S71.

According to the present embodiment, operations management information of devices is aggregated for each relay and for each protocol and changes in the operations management information at the time of condition monitoring are judged. This configuration makes it possible to efficiently reduce the communication load without reducing information obtainable at the time of condition monitoring as much as possible.

Embodiment 6

In Embodiment 6, an example of learning operations management information after the method of transmitting and receiving a condition monitoring packet is changed in Embodiments 1 to 5 will be described. In the present embodiment, for example, a change of the monitoring interval, a change of the monitoring timing, a change of the protocol, stop of transmission and reception of monitoring packets, and a change in the operations management information after processing of these are learned.

In the present embodiment, the method determining unit 41 receives a change in the operations management information indicating the terminal quality at the time of condition monitoring from the change judging unit 40, judges whether or not the change in the operations management information indicating the terminal quality at the time of condition monitoring has been changed (worsened or unchanged or improved) for a device for which the monitoring method has been changed, and registers the result of the judgment to the monitoring management database 39. For example, in the case of "worsened to improved" or "worsened to unchanged", the effect is turned to "Present". The method determining unit 41 manages the presence or absence of the effect for each protocol and for each device.

Next, when a change in the operations management information indicating the terminal quality at the time of condition monitoring of a registered device is worsened, the method determining unit 41 changes the method to the effective method registered in the monitoring management database 39. When a change in the operations management information indicating the terminal quality at the time of condition monitoring of an unregistered device is worsened, the method may be changed to the same method as that of another device with the same relay or protocol.

FIG. 19 is a diagram illustrating the presence or absence of the effect registered in the monitoring management database 39. As illustrated in FIG. 19, the presence or absence of the effect is registered in advance for each protocol and for each device.

According to the present embodiment, the presence or absence of the effect of improving the terminal quality is held in advance for each of the methods of transmitting and receiving a condition monitoring packet. Hence, it is possible to determine the method that has the effect of improving the terminal quality.

Embodiment 7

In Embodiment 7, an example of adjusting the interval or timing of collecting the operations management information depending on the transmission interval or transmission timing of a condition monitoring packet will be described. In the present embodiment, the operations management information acquiring unit 33 acquires information on monitoring interval and monitoring timing for each device which is registered in the monitoring management database 39. The operations management information acquiring unit 33 acquires operations management information indicating the communication quality between the sensor node 10 and the gateway 30 a plurality of times at the monitoring timing and during the monitoring interval, stores the acquired operations management information into the operations management information database 34, and notifies the abnormality judging unit 35 of the update of the operations management information database 34.

Since coincidence of the condition monitoring timing and the operations management information acquisition timing leads to a high possibility of an increase in communication load, it is desirable to acquire operations management information slightly after the condition monitoring timing. It is desirable to adjust the operations management information acquisition timing such that the operations management information acquisition timing does not coincide with the condition monitoring timings and the operations management information acquisition timing of the other devices.

In the present embodiment, the change judging unit 40 receives the notification that a condition monitoring packet has been transmitted or received, from the monitoring unit 38. The change judging unit 40 acquires information on monitoring interval and monitoring timing for each device which is registered in the monitoring management database 39. The change judging unit 40 acquires, from the operations management information database 34, a plurality of pieces of operations management information on the device collected, between the timing at which a condition monitoring packet was transmitted and received and the timing at which a condition monitoring packet was previously transmitted and received. The change judging unit 40 judges a change (worsened or unchanged or improved) in the operations management information for each device.

According to the present embodiment, the interval or timing of acquiring the operations management information is adjusted depending on the interval or timing of transmitting and receiving a condition monitoring packet. This makes it possible to suppress an increase in communication load.

(Device Configuration of Gateway)

Figure 20:
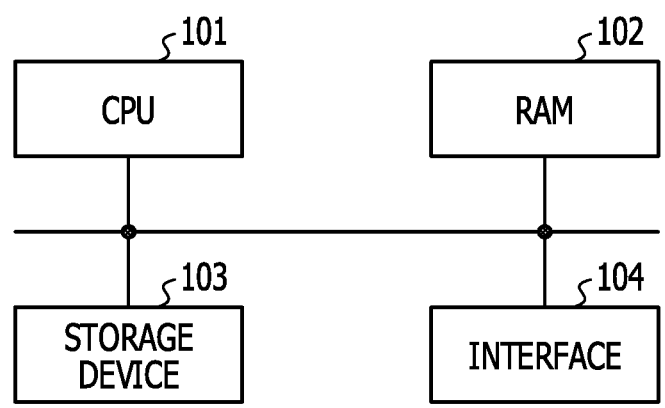
FIG. 20 is a block diagram illustrating a hardware configuration of a gateway.

FIG. 20 is a block diagram illustrating a hardware configuration of the gateway 30. As illustrated in FIG. 20, the gateway 30 includes a CPU 101, a random-access memory (RAM) 102, a storage device 103, an interface 104, and the like.

The CPU 101 is a central processing unit. The CPU 101 includes one or more cores. The RAM 102 is a volatile memory that temporarily stores a program to be executed by the CPU 101, data to be processed by the CPU 101, and the like. The storage device 103 is a nonvolatile storage device. As the storage device 103, for example, a read-only memory (ROM), a solid state drive (SSD) such as a flash memory, a hard disk driven by a hard disk drive, or the like may be used. The storage device 103 stores a program. The interface 104 is a device to communicate with the relay 20. Each component of the gateway 30 may be implemented by execution of a program or may be hardware such as a dedicated circuit. The functions of the gateway 30 may be implemented on a cloud.

In each of the above-described embodiments, the operations management information acquiring unit 33 functions as an example of an acquiring unit that acquires operations management information in communications with one or more devices. The monitoring unit 38 functions as an example of a monitoring unit that monitors conditions of the one or more devices by transmitting or receiving a condition monitoring packet to or from the one or more devices. The change judging unit 40 functions as an example of a judging unit that judges whether the operations management information has been worsened at the time of transmitting or receiving the condition monitoring packet. The method determining unit 41 functions as an example of a determining unit that determines a method of transmitting or receiving the condition monitoring packet depending on a result of judgment made by the judging unit. The gateway 30 functions as an example of an operations management apparatus.

Although the present embodiments of the present disclosure have been described above in detail, the present disclosure is not limited to these particular embodiments and may be variously modified and changed within the gist of the disclosure described in claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An operations management apparatus comprising:
a memory; and
a processor coupled to the memory, the processor being configured to
execute an acquiring processing that includes acquiring operations management information in communications with one or more devices,
execute a monitoring processing that includes monitoring conditions of the one or more devices by transmitting or receiving a condition monitoring packet to or from the one or more devices, the condition monitoring packet being a packet complying with any one of a plurality of protocols set for the one or more devices,
execute a judging processing that includes judging whether the operations management information has been worsened at a time of transmitting or receiving the condition monitoring packet, and
execute a determining processing that includes determining, based on a result of judgment made by the judging processing, a method of transmitting or receiving the condition monitoring packet by selecting, as the method of transmitting or receiving the condition monitoring packet, any one of the plurality of protocols different from the condition monitoring packet used in the monitoring processing last executed,
wherein the determining processing is configured to select an unused protocol from among a plurality of protocols set in the one or more devices for transmitting or receiving the condition monitoring packet.

2. The operations management apparatus according to claim 1, wherein the determining processing is configured to change a transmission timing or a transmission interval for transmitting or receiving the condition monitoring packet.

3. The operations management apparatus according to claim 1, wherein
the judging processing is configured to judge whether the operations management information has been worsened in an unused protocol among a plurality of protocols set in the one or more devices at the time of transmitting or receiving the condition monitoring packet, and
when the operations management information is judged to have been worsened in the unused protocol, the monitoring processing is configured to stop the transmission or reception of the condition monitoring packet of the one or more devices.

4. The operations management apparatus according to claim 1, wherein
the operations management information includes operations management information indicating communication quality of the one or more devices,
the judging processing is configured to judge whether the operations management information indicating the communication quality has been worsened at the time of transmitting or receiving the condition monitoring packet, and
the determining processing is configured to determine the method of transmitting or receiving the condition monitoring packet depending on a result of judgment made by a judging unit on the operations management information indicating the communication quality.

5. The operations management apparatus according to claim 1, wherein
the operations management information includes operations management information indicating terminal quality of each of the one or more devices,
the judging processing is configured to judge whether the operations management information indicating the terminal quality has been worsened at the time of transmitting or receiving the condition monitoring packet, and
the determining processing is configured to determine the method of transmitting or receiving the condition monitoring packet, for each of the one or more devices, depending on a result of judgment made by the judging processing on the operations management information indicating the terminal quality.

6. The operations management apparatus according to claim 1, wherein
the one or more devices include a plurality of sensor nodes and one or more relays that relay and transmit measured values of the plurality of sensor nodes to the operations management apparatus, the judging processing is configured to judge whether the operations management information has been worsened at the time of transmitting or receiving the condition monitoring packet for each relay and for each protocol for transmitting or receiving the condition monitoring packet, and the determining processing is configured to determine the method of transmitting or receiving the condition monitoring packet depending on a result of judgment made by the judging processing.

7. The operations management apparatus according to claim 1, wherein the determining processing is configured to hold in advance presence or absence of an effect of improving terminal quality for each of the methods of transmitting or receiving the condition monitoring packet, and determine the method that has the effect of improving the terminal quality.

8. The operations management apparatus according to claim 1, wherein the acquiring processing is configured to adjust an interval or timing of acquiring the operations management information depending on an interval or timing of transmitting or receiving the condition monitoring packet.

9. An operations management system comprising:

one or more devices;

an operations management apparatus configured to communicate with the one or more devices, wherein the operations management apparatus includes:

a memory; and a processor coupled to the memory, the processor being configured to execute an acquiring processing that includes acquiring operations management information in communications with the one or more devices;

execute a monitoring processing that includes monitoring conditions of the one or more devices by transmitting or receiving a condition monitoring packet to or from the one or more devices, the condition monitoring packet being a packet complying with any one of a plurality of protocols set for the one or more devices;

execute a judging processing that includes judging whether the operations management information has been worsened at a time of transmitting or receiving the condition monitoring packet; and execute a determining processing that includes determining, based on a result of judgment made by the judging processing, a method of transmitting or receiving the condition monitoring packet by selecting, as the method of transmitting or receiving the condition monitoring packet, any one of the plurality of protocols different from the condition monitoring packet used in the monitoring processing last executed, wherein the determining processing is configured to select an unused protocol from among a plurality of protocols set in the one or more devices for transmitting or receiving the condition monitoring packet.

10. An operations management method implemented by a computer, the operations management method comprising:

executing an acquiring processing that includes acquiring operations management information in communications with one or more devices;

executing a monitoring processing that includes monitoring conditions of the one or more devices by transmitting or receiving a condition monitoring packet to or from the one or more devices, the condition monitoring packet being a packet complying with any one of a plurality of protocols set for the one or more devices;

executing a judging processing that includes judging whether the operations management information has been worsened at a time of transmitting or receiving the condition monitoring packet; and executing a determining processing that includes determining, based on a result of judgment made by the judging processing, a method of transmitting or receiving the condition monitoring packet by selecting, as the method of transmitting or receiving the condition monitoring packet, any one of the plurality of protocols different from the condition monitoring packet used in the monitoring processing last executed, wherein the determining processing is configured to select an unused protocol from among a plurality of protocols set in the one or more devices for transmitting or receiving the condition monitoring packet.

\* \* \* \* \*